United States Patent
Pahl et al.

(10) Patent No.: US 11,940,310 B2
(45) Date of Patent: Mar. 26, 2024

(54) METERING UNIT FOR FREE-FLOWING SOLIDS

(71) Applicant: AZO Holding GmbH, Osterburken (DE)

(72) Inventors: Frank Pahl, Höpfingen (DE); Jürgen Böhrer, Heilbronn (DE); Tobias Schmitt, Osterburken (DE)

(73) Assignee: AZO Holding GmbH, Osterburken (DE)

( * ) Notice: Subject to any disclaimer, the term of this patent is extended or adjusted under 35 U.S.C. 154(b) by 454 days.

(21) Appl. No.: 17/418,543

(22) PCT Filed: Feb. 6, 2020

(86) PCT No.: PCT/EP2020/000034
§ 371 (c)(1),
(2) Date: Jun. 25, 2021

(87) PCT Pub. No.: WO2020/164791
PCT Pub. Date: Aug. 20, 2020

(65) Prior Publication Data
US 2022/0026255 A1   Jan. 27, 2022

(30) Foreign Application Priority Data
Feb. 15, 2019 (DE) ..................... 10 2019 103 900.2

(51) Int. Cl.
*G01F 11/08* (2006.01)
*G01G 13/00* (2006.01)

(52) U.S. Cl.
CPC ......... *G01F 11/088* (2013.01); *G01G 13/006* (2013.01)

(58) Field of Classification Search
CPC ........................... G01F 11/088; G01G 13/006
See application file for complete search history.

(56) References Cited

U.S. PATENT DOCUMENTS

| 3,002,660 A | 10/1961 | Taylor |
| 3,342,318 A | 9/1967 | Ruekberg et al. |
| (Continued) | | |

FOREIGN PATENT DOCUMENTS

| DE | 1511979 | 6/1970 |
| DE | 202007003535 U1 | 7/2007 |
| (Continued) | | |

OTHER PUBLICATIONS

International Search Report, with English translation, issued in corresponding International Application No. PCT/EP2020/000034 dated May 14, 2020 (6 pages).

(Continued)

*Primary Examiner* — Bob Zadeh
(74) *Attorney, Agent, or Firm* — FLYNN THIEL, P.C.

(57) ABSTRACT

A metering unit for flowable solids including an outlet nozzle of flexibly elastic material having at one end an inlet opening for fixing on the outlet of a storage container and at its other end a slot-shaped outlet opening formed between two opposite sealing lips and elastically preloaded in the closed position and can be transferred against elastic preloading to an open position as a result of compressive forces. The slot-shaped outlet opening is elastically preloaded into its closed position by a separate clamp made from a flexibly elastic material, which can be applied releasably to the outer circumference of the sealing lips, wherein the legs of the clamp rest on the outside of the sealing lips in the mounted state and are elastically preloaded in the direction in which they are close together and can be moved elastically away from one another as a result of the compressive forces.

21 Claims, 4 Drawing Sheets

(56) References Cited

U.S. PATENT DOCUMENTS

| | | | |
|---|---|---|---|
| 3,773,233 A | 11/1973 | Souza | |
| 4,564,127 A | 1/1986 | Garabedian et al. | |
| 5,402,913 A * | 4/1995 | Graf | F16N 13/06 |
| | | | 417/478 |
| 5,730,327 A * | 3/1998 | Stern | B67D 3/041 |
| | | | 222/105 |
| 7,104,293 B2 | 9/2006 | Lais et al. | |
| 11,768,095 B2 * | 9/2023 | Battle | G01F 11/263 |
| | | | 222/1 |
| 2001/0027822 A1 | 10/2001 | Bertolo | |
| 2010/0147882 A1 * | 6/2010 | Bohler | B65B 9/20 |
| | | | 53/558 |
| 2010/0193078 A1 * | 8/2010 | Bohler | B65D 47/2031 |
| | | | 141/364 |
| 2013/0043280 A1 * | 2/2013 | Hagleitner | B65D 47/32 |
| | | | 222/207 |
| 2014/0367422 A1 * | 12/2014 | Drennow | B67D 1/108 |
| | | | 222/207 |
| 2022/0026255 A1 * | 1/2022 | Pahl | G01G 13/006 |

FOREIGN PATENT DOCUMENTS

| | | |
|---|---|---|
| EP | 2199208 A1 | 6/2010 |
| GB | 1300063 | 12/1972 |
| WO | 2008017173 A2 | 2/2008 |

OTHER PUBLICATIONS

Written Opinion of International Searching Authority issued in corresponding International Application No. PCT/EP2020/000034 dated May 14, 2020 (7 pages).

German Search Report issued in corresponding German Application No. 10 2019 103 900.2, dated Jan. 22, 2020 (4 pages).

* cited by examiner

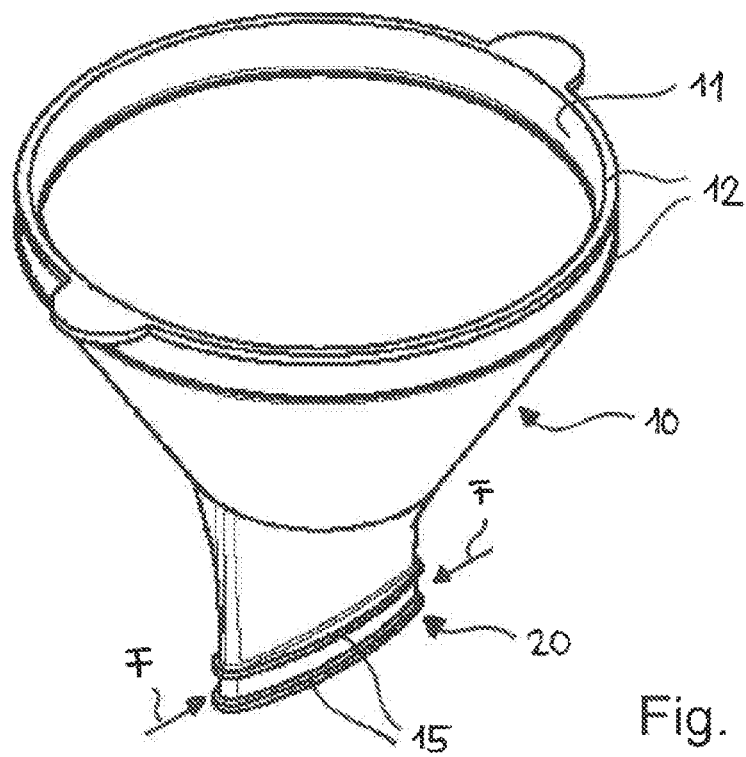
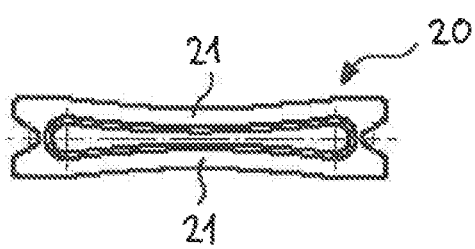
Fig. 5
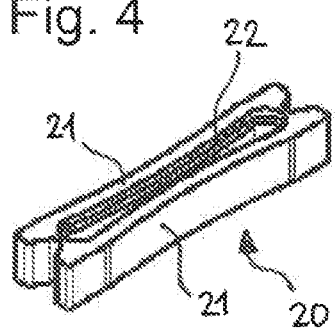
Fig. 6
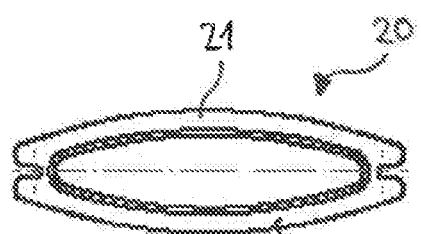
Fig. 7
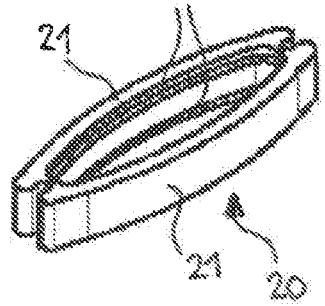
Fig. 8

METERING UNIT FOR FREE-FLOWING SOLIDS

The invention relates to a metering unit for flowable solids, having an outlet nozzle which is moulded from a first flexibly elastic material and has at one end an inlet opening, which is designed for fixing on the outlet of a storage container, and at its other end a substantially slot-shaped outlet opening, which is formed between two opposite sealing lips of the outlet nozzle and is elastically preloaded in the direction of its closed position and can be transferred against its elastic preloading to an open position as a result of compressive forces which act approximately in its direction of extent.

Such metering units for powdered and/or particulate flowable solids are known and are used, in particular, for metering and, optionally, mixing individual bulk material components in accordance with a prescribed recipe, it being possible for the bulk material components to be, for example, any chemicals, including constituents of colourants, such as dyes, pigments, etc., polymer granules, foodstuffs, pharmaceutical active ingredients, building materials and the like. For this purpose, the outlet nozzle of the metering unit, which is manufactured from a material that can be deformed in a flexibly elastic manner, can be fastened, whether releasably or in a fixed manner, by means of its inlet opening to the outlet end of a storage container holding the respective flowable solid, wherein the substantially slot-shaped outlet opening arranged at the opposite end of the outlet nozzle closes the outlet nozzle by virtue of the elastic preloading of said opening into its closed position, in which the sealing lips bounding between them the outlet opening rest against one another. In order to be able to remove from the storage container, provided with the outlet nozzle of the metering unit, a desired quantity of the flowable solids stored therein, the substantially slot-shaped outlet opening of the outlet nozzle can be transferred against its elastic preloading to an open position by exerting on the substantially slot-shaped outlet opening compressive forces which compress the slot-shaped outlet opening approximately in the direction of extent thereof, with the result that the sealing lips bounding between them the slot-shaped outlet opening are moved elastically away from one another, and the outlet opening is thus opened. Once the desired quantity of the respective flowable solid has been metered, the substantially slot-shaped outlet opening of the outlet nozzle can be relieved of pressure again, whereupon it is closed again into the closed position as a result of its elastic preloading, and the sealing lips come to rest against one another.

However, the outlet nozzles of metering units of the type in question, said nozzles being moulded from flexibly elastic materials, such as silicone, rubber or other elastomeric polymer materials, for example polyurethanes and the like, have the disadvantage that there are limits to the elastic preloading of the substantially slot-shaped outlet opening into the closed position, which can be set by means of the elastic reverse deformation capacity of the outlet nozzles, based on the material and geometry, it no longer being possible to seal the outlet nozzles leak-tightly with increasing size of the nozzles or with increasing length of the slot-shaped outlet opening solely on the basis of the elastically preloaded contact of the sealing lips with one another. The same applies with increasing service life and the associated material fatigue after frequent opening and closing of the substantially slot-shaped outlet opening of the outlet nozzle.

WO 2008/017173 A2 describes a metering unit of the type in question having an outlet nozzle which is produced from a flexibly elastically deformable material and has a slot-shaped outlet opening. In order to support the elastic reverse deformation of the slot-shaped outlet opening of the outlet nozzle from its open position as a result of the action of compressive forces into its closed position, a return device can be provided which projects into the outlet nozzle of the metering unit in a spring-assisted manner or is integrated therein, it being possible, in particular, to provide spiral springs or strips of shape memory alloys vulcanized onto or into the polymer material of the outlet nozzle. However, not only is this found to be complicated from the point of view of design, but, in particular, it is necessary that flowable solids which must satisfy high hygiene requirements should be protected from contact with springs or other metal parts reaching into the solid bed in order not to introduce contaminants. Moreover, particularly in the case of relatively fine-particle solids, there is the risk of electrostatic charging of metal parts which are not earthed, which can lead to spark discharges or even dust explosions, for which reason the use of such metal parts, such as springs or shape memory strips, should not be considered in many applications. A similar metering unit, whose flexibly elastically deformable outlet nozzle is lined with a film tube in order to avoid contamination of the environment, which film tube can be stretched by means of a stretching device in order to reduce the cross section of the film tube or to close it by means of a welding device, is known from EP 2 199 208 A2.

Furthermore, DE 1 511 979 A1 discloses dispensing and closing devices, similar to the metering unit of the type in question, for small containers, such as pocket ashtrays or tablet dispensers, which have a dispensing and closing nozzle made of a flexibly elastically deformable material which is fastened to an opening cross section of the small container. A slot-shaped outlet opening of the dispensing and closing nozzle is elastically preloaded into its closed position and can be opened as required by means of manual compressive forces acting parallel thereto on said opening.

The problem underlying the invention is that of developing a metering unit for flowable solids of the type mentioned at the outset in a simple and low-cost manner, while at least largely avoiding the abovementioned disadvantages, in such a way that the substantially slot-shaped outlet opening of the flexibly elastically deformable outlet nozzle can always be held securely and reliably in its closed position, but nevertheless simple opening of the slot-shaped outlet opening as a result of the action of compressive forces is ensured.

According to the invention, this problem is solved in the case of a metering unit of the type stated at the outset by virtue of the fact that the substantially slot-shaped outlet opening of the outlet nozzle is elastically preloaded into its closed position by means of a separate clamp made from a second flexibly elastic material, which can be applied releasably to the outer circumference of the sealing lips bounding the outlet opening, wherein the legs of the clamp, which rest on the outside of the sealing lips in the mounted state, are elastically preloaded in the direction of the position in which they are close together, and can be moved elastically away from one another as a result of the compressive forces which act approximately in their direction of extent.

The embodiment according to the invention ensures a permanent and reliable elastic preloading of the outlet opening of the outlet nozzle into the closed position, wherein the clamp releasably mounted on the outer circumference of the sealing lips bounding the outlet opening always ensures reliable elastic preloading of the sealing lips of the outlet nozzle bounding the outlet opening between them towards one another into the closed position. The outlet opening of the flexibly elastically deformable outlet nozzle, which outlet opening is provided with the clamp according to the invention, can be opened in a simple manner in that the legs of the clamp resting on the outside of its sealing lips, which are elastically preloaded in the direction of the position in which they are close together, are acted upon by compressive forces acting approximately parallel to their direction of extent in order to move them elastically away from one another and, in the process, to expose the outlet opening or to transfer them to an open position with sealing lips spread apart. Since the direction of force for spreading apart the legs of the clamp is the same as for spreading apart the sealing lips of the outlet nozzle which bound the outlet opening between them, the sealing lips are at the same time spaced apart from one another and the substantially slot-shaped outlet opening of the outlet nozzle is opened. As soon as the outlet opening of the outlet nozzle is to be closed again after metering in the desired quantity of a respective flowable solid, only a pressure relief of the clamp and of the sealing lips bounding the outlet opening between them is required, whereupon said lips are transferred to the closed position by virtue of the elastic preloading of the clamp and, if appropriate, additionally by virtue of their own elastic preloading. It should be pointed out at this point that the substantially slot-shaped outlet opening does not necessarily have to extend exactly linearly, but can also have, for example, an approximately sinusoidal, zigzag or other shape.

A further advantage of the embodiment according to the invention, in addition to the very simple structural configuration of the clamp as a separate component which can be mounted on the outer circumference of the sealing lips bounding the outlet opening of the outlet nozzle between them and is consequently also easily exchangeable, if necessary, is in particular that the clamp is situated exclusively on the outside of the outlet nozzle and no additional parts are required in the interior thereof in order thereby to avoid contamination of the bulk materials to be metered. Moreover, the embodiment according to the invention requires no energy whatsoever and fulfils its intended function solely on the basis of the elastic, mechanical preloading of the outlet opening into the closed position brought about thereby. As explained in more detail below, the clamp and also the outlet nozzle itself can be formed in particular from metal-free materials, for example from elastomeric polymer materials, so that the above-described problem of electrostatic charging of metal parts does not arise during powder metering.

The substantially slot-shaped outlet opening formed between the sealing lips of the outlet nozzle moulded from the first flexibly elastically deformable material does not necessarily likewise have to be elastically preloaded in the direction of its closed position, as is necessarily the case in the prior art described at the outset, but this can preferably also be additionally provided in order, for example, in the event of failure or replacement of the clamp, nevertheless to ensure satisfactory leak-tightness of the outlet opening solely by virtue of its elastic preloading into the closed position. Accordingly, the substantially slot-shaped outlet opening formed between the sealing lips can advantageously be elastically preloaded in the direction of its closed position solely on account of the elastic reverse deformation behaviour of the first elastically flexible material of the outlet nozzle.

In order in a simple manner to provide more or less solely by virtue of the shape of the clamp cooperating with the sealing lips bounding the outlet opening of the outlet nozzle between them, provision can be made in an advantageous embodiment for the sealing lips forming the outlet opening of the outlet nozzle between them to have an outer circumference which is convexly curved at least in some section or sections or in particular even substantially completely convexly, while the legs of the clamp in the unmounted state thereof have an inner circumference which, in comparison therewith, is convexly curved to a lesser extent, is substantially rectilinear or in particular even concavely curved. Consequently, the elastic preloading of the sealing lips results towards one another so as to close the outlet opening, mainly by virtue of the elastic deformation of the legs of the clamp when the latter is mounted on the convexly curved outer circumference of the sealing lips, wherein the legs of the clamp, which, for their part, are slightly convexly curved, substantially straight or in particular even concavely curved or tapered in the unloaded, unmounted state, are bent outwards along the convexly curved sealing lips and, by virtue of their elastic restoring capacity, ensure the necessary elastic preloading of the outlet opening in its closed position. In addition, this also results in simple transfer of the outlet opening to an open position in that, as mentioned above, the legs of the clamp, which rest on the outside of the sealing lips in the mounted state, are moved away from one another or spread apart elastically together with the sealing lips as a result of compressive forces acting approximately in their direction of extent.

The clamp can expediently be of substantially annular configuration and, in the mounted state, can engage around the entire circumference of the sealing lips forming the outlet opening of the outlet nozzle between them, in order to ensure a large elastic restoring force with high durability.

The clamp, which can be mounted releasably on the outer circumference of the sealing lips of the outlet nozzle which form the outlet opening between them, can in principle be mounted more or less in a purely non-positive manner on the outer circumference of the sealing lips bounding the outlet opening of the outlet nozzle. However, with a view to permanent fastening of the clamp without the risk of unintentional slipping of the clamp even during prolonged operating times, it may be advantageous if the clamp can furthermore be mounted positively on the outer circumference of the sealing lips bounding the outlet opening of the outlet nozzle, wherein it is possible for the clamp to be equipped, in particular, with inner engagement structures which are complementary to outer engagement structures of the sealing lips in order to ensure positive and axially fixed, releasable attachment of the clamp to the outer circumference of the sealing lips of the outlet nozzle in the manner of a latching connection, in which the inner engagement structures of the clamp are in engagement with the outer engagement structures, complementary thereto, of the sealing lips. The engagement structures can comprise, for example, circumferential recesses or circumferential projections which are complementary to one another and which can be provided on the one hand on the outer circumference of the sealing lips and on the other hand on the inner circumference of the clamp. Alternatively or in addition, it is possible, for example, to conceive of two outer circumferential projections of the sealing lips, between which the clamp can be mounted in order to hold the latter likewise positively and in an axially fixed manner. However, in order to ensure secure seating of the clamp on the outer circumference of the sealing lips of the outlet nozzle, any other mutually complementary engagement structures are, of course, also conceivable.

It is possible, for example, for the outlet nozzle to taper approximately in the shape of a funnel from its inlet opening in the direction of its substantially slot-shaped outlet opening. In this case, the inlet opening can be, for example, approximately circular or can have any other desired circumferential shape matched to the outlet of a respective storage container on which the outlet nozzle is to be arranged.

The inlet opening of the outlet nozzle can furthermore preferably be releasably fastened to the storage container, wherein the inlet opening is provided, in particular on its outer circumference, with fastening structures which serve for the non-positive and/or positive attachment of a pipe clamp or the like which serves for the releasable clamping of the outlet nozzle on the outlet of the storage container. In addition, of course, it is also conceivable for there to be any desired engagement structures on the inside of the inlet opening of the outlet nozzle which are complementary to engagement structures arranged on the outside of the outlet of the storage container, such as, for example, mutually complementary circumferential recesses or circumferential projections, in order to ensure a secure and durable but nevertheless releasable connection between the outlet nozzle and the outlet of the storage container.

As already indicated, the first flexibly elastic material of the outlet nozzle is preferably a first elastomeric polymer material, for example silicone, rubber or any other, preferably thermoplastic, elastomers, such as polyurethane elastomers or the like. In this case, it is possible, in particular, for the outlet nozzle to be formed or moulded integrally from the first elastomeric polymer material in order to satisfy increased hygiene requirements of the kind that generally have to be observed, for example, in the handling of chemical or pharmaceutical solids. The flexibly elastically deformable polymer material of the outlet nozzle can, of course, have added to it additives including fillers and reinforcing materials or—fibres in a manner known per se. According to an embodiment which is simple and inexpensive in terms of production, the outlet nozzle can furthermore be moulded, for example, as an injection-moulding or casting from the first flexibly elastic elastomeric polymer material.

As likewise already indicated, the second flexibly elastic material of the clamp can likewise preferably be a second elastomeric polymer material, e.g. likewise silicone, rubber or any other, preferably thermoplastic, elastomers, for example polyurethane elastomers or the like, thus making the use of metal materials both for the clamp and for the outlet nozzle of the metering unit superfluous. In this case, the clamp can advantageously be formed integrally from the second elastomeric polymer material and, for example, likewise as an injection moulding or casting, in order, in addition to simple and low-cost production, on the one hand to ensure high ease of maintenance with very low assembly or disassembly effort and, on the other hand, to be able to satisfy high hygiene requirements, such as, for example, in the case of use in clean rooms, which would often be difficult to satisfy in the case of a construction of the clamp with a plurality of individual parts fixed to one another. Furthermore, the second elastically flexible material of the clamp can, in particular, have a greater modulus of elasticity (elastic modulus) than the first elastically flexible material of the outlet nozzle, i.e. the elastically flexible material of the clamp requires greater deformation forces for its elastic deformation than that of the outlet nozzle, is consequently somewhat "more rigid" in order to ensure sufficiently high elastic preloading of the outlet opening of the outlet nozzle into the closed position in the state of the clamp mounted on the sealing lips of the outlet nozzle. Alternatively, it is also possible, in principle, for the same flexibly elastic materials to be used both for the outlet nozzle and for the clamp.

According to an advantageous development of the metering unit according to the invention, provision can furthermore be made for it to comprise an actuating device which is designed to apply compressive forces to the clamp mounted on the outer circumference of the sealing lips bounding the outlet opening of the outlet nozzle, approximately in the direction of extent of the legs thereof which rest on the outside of the sealing lips, in order, during a metering operation, to move the legs of the clamp elastically away from one another and in the process to transfer the substantially slot-shaped outlet opening of the outlet nozzle from its closed position into an open position.

In this case, the actuating device has, in particular, two actuating fingers, which can be moved towards one another and away from one another and which serve to apply the compressive forces to the clamp mounted on the outer circumference of the sealing lips bounding the outlet opening of the outlet nozzle, more specifically—as already mentioned—in a direction both approximately in the direction of extent of the legs of the clamp and of the substantially slot-shaped outlet opening. Here, the actuating fingers can be movable towards and away from one another in any desired manner, such as, for example, translationally along guides, rotationally by pivoting about a respective pivot axis, etc.

In addition, the actuating fingers of the actuating device can each be provided on their mutually facing sides with an engagement profile, which is configured, in particular, in a manner substantially complementary to the outer contour of the mutually opposite ends of the clamp, in order to ensure reliable support of the clamp on the actuating fingers when the latter are moved towards one another during a metering operation in order to deform the legs of the clamp and, at the same time, the sealing lips of the outlet nozzle which form the outlet opening between them elastically outwards away from one another and, in the process, to transfer the outlet opening to an open position.

While the actuating fingers of the actuating device can, in principle, also be moved towards and away from one another manually, it has proven advantageous with regard to an automated metering unit if the actuating fingers can be moved in a controlled manner by means of a motor drive, e.g. in the form of electric motors, such as servomotors or the like. In addition, fluidic, such as pneumatic, hydraulic or hydropneumatic, motor drives, e.g. in the form of hydraulic motors, are also conceivable.

In this connection, provision can be made in an advantageous embodiment for the actuating device to comprise an electronic control unit, such as a CPU unit, which is operatively connected to the motor drive of the actuating fingers in order to actuate them in accordance with the respectively desired metered quantity in an automated manner or by means of commands which can be input into an operating module of the control unit. In particular, it is furthermore possible here for the control unit to be operatively connected to a weighing device in order to actuate the actuating fingers in accordance with the desired metered quantity or to move them apart again and thereby close the outlet opening of the outlet nozzle as a result of elastic return of the clamp as soon as the desired metered quantity has been gravimetrically detected by means of the weighing device. The weighing device can, for example, either be assigned to the storage container provided with the outlet nozzle in order to detect the mass of flowable solid removed therefrom, or it can be assigned to a collecting container to which the flowable solid is metered in order to detect the mass of flowable solid fed thereto. It can furthermore be connected to the control unit of the metering unit either wirelessly or by means of cables.

In a further advantageous embodiment, provision can be made for the actuating fingers of the actuating device to be able to be moved to different distances from one another by means of their motor drive in order to set different opening widths of the substantially slot-shaped outlet opening of the outlet nozzle, such as, for example, one or more small opening width(s) for the purpose of fine metering (the distance between the actuating fingers is only slightly smaller than the length of the clamp mounted on the outlet nozzle in the state of rest) or one or more large opening width(s) for the purpose of coarse metering (the distance between the actuating fingers is considerably smaller than the length of the clamp mounted on the outlet nozzle in the state of rest).

Moreover, it is possible, in an advantageous embodiment, to impart to the actuating fingers of the actuating device an oscillatory movement, in particular with a pre-settable amplitude, by means of their motor drive in order to ensure improved discharge of the metered, flowable solids during a metering operation when the outlet opening of the outlet nozzle is set to an open position. The oscillatory movement can be, in particular, a vibrational movement, preferably in the direction of movement of the actuating fingers towards and away from one another, thus increasing the flowability of the powdered and/or particulate solids during the metering process and ensuring that these can always "continue to slide" without an interruption of the material flow and without the supply container provided with the outlet nozzle having to be equipped, in particular, with a stirrer.

Further features and advantages of the invention will be found in the following description of an exemplary embodiment with reference to the drawings, in which:

FIG. 4 shows a schematic perspective view of the outlet nozzle corresponding to FIG. 1 without the clamp;

FIG. 5 shows a schematic plan view of the clamp according to FIGS. 1 to 3 in the unmounted, undeformed state;

FIG. 6 shows a schematic perspective view of the clamp according to FIG. 5 in the unmounted, undeformed state;

FIG. 7 shows a schematic plan view of the clamp according to FIGS. 5 and 6 corresponding to FIG. 5 in an elastically deformed state, corresponding to the state of the clamp mounted on the outlet nozzle as shown in FIGS. 1 to 3;

FIG. 8 shows a schematic perspective view, corresponding to FIG. 6, of the clamp according to FIG. 7 in an elastically deformed state, corresponding to the state of the clamp mounted on the outlet nozzle as shown in FIGS. 1 to 3;

Figure 9:
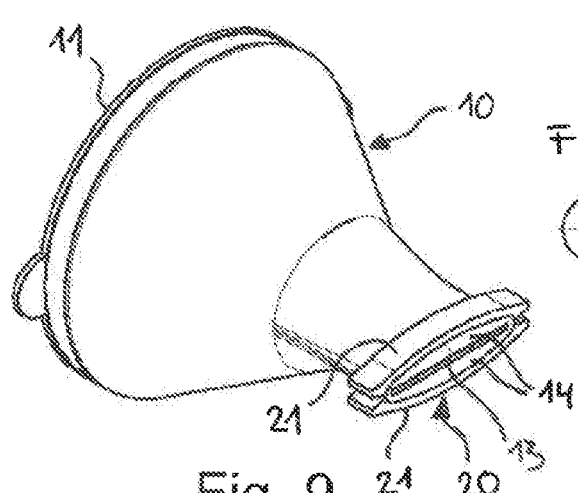
FIG. 9 shows a schematic perspective view of the outlet nozzle with clamp mounted on the outside of its substantially slot-shaped outlet opening in the state of rest (no metering)
Figure 10:
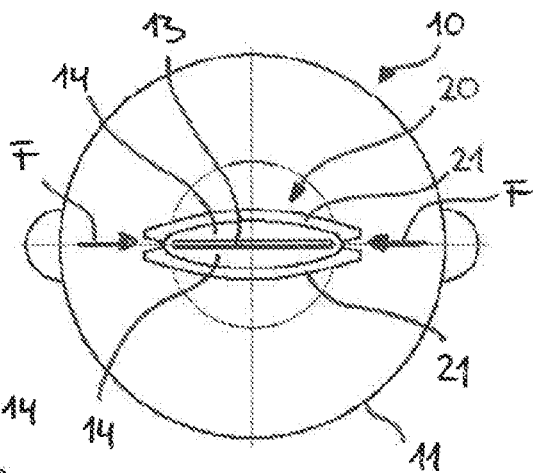
FIG. 10 shows a schematic plan view from below of the outlet nozzle provided with the clamp, in the situation according to FIG. 9 (no metering)
Figure 11:
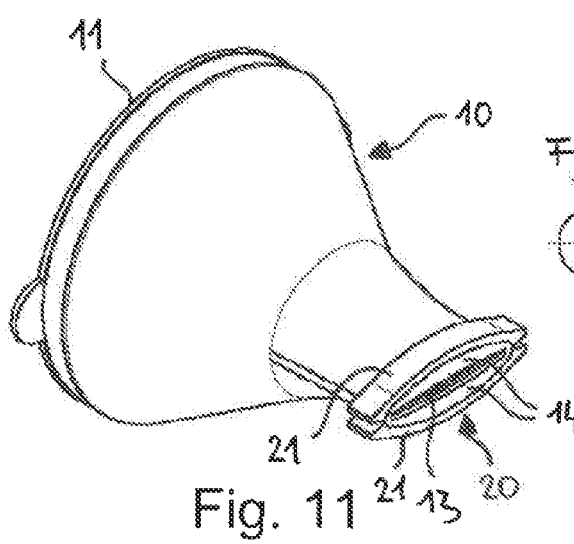
Figure 12:
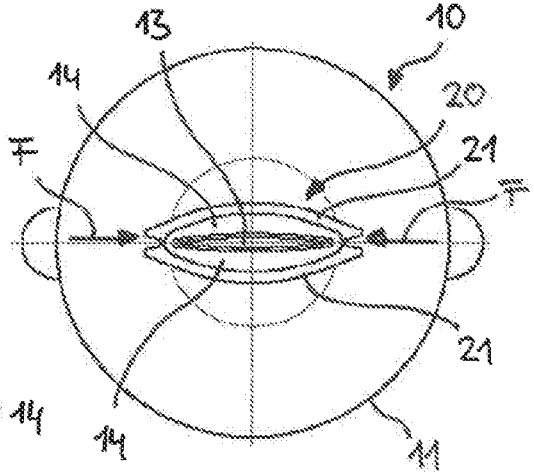
Figure 13:
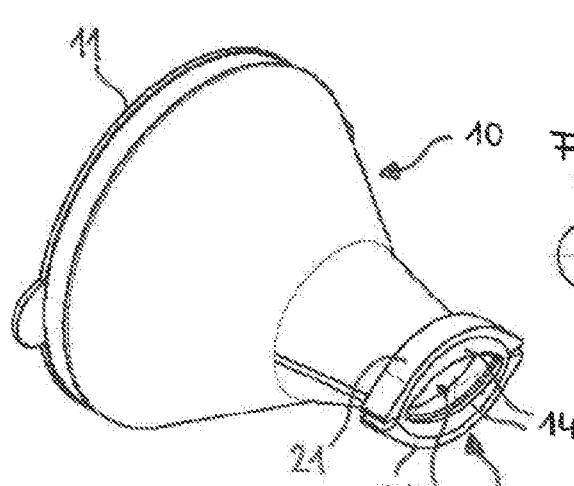
Figure 14:
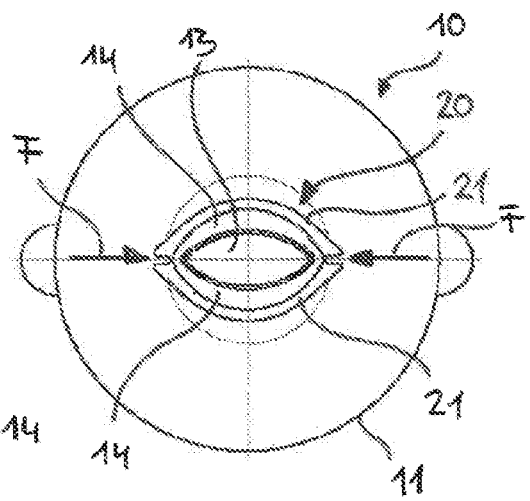
Figure 15:
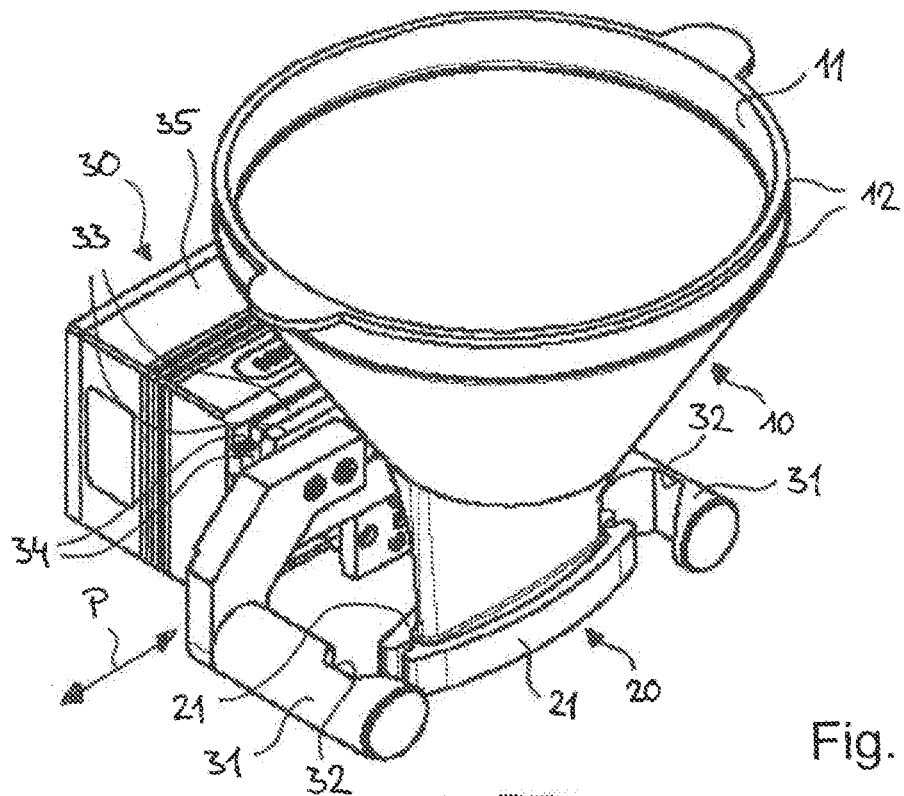
Figure 16:
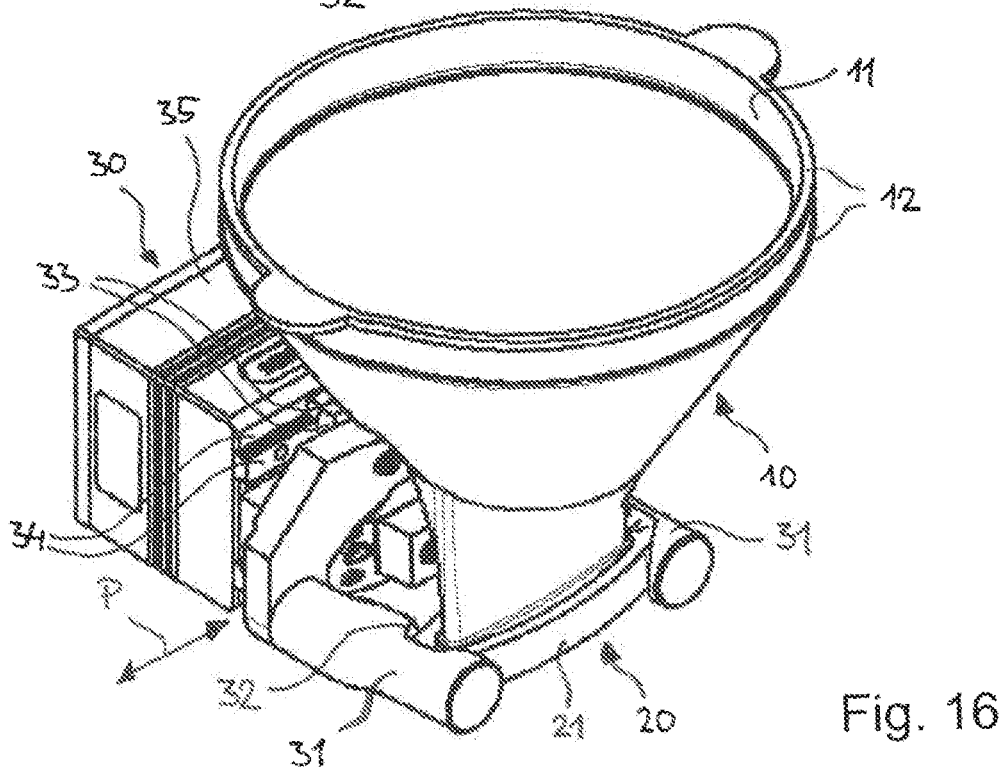

FIG. 11 shows a schematic perspective view of the outlet nozzle corresponding to FIG. 9, with a clamp mounted on the outside of the substantially slot-shaped outlet opening thereof, wherein the clamp has been elastically deformed as a result of compressive forces acting approximately in the direction of extent of its legs in order to move the outlet opening into an open position with a small opening cross section (fine metering);

FIG. 12 shows a schematic plan view from below of the outlet nozzle provided with the clamp, in the situation according to FIG. 11 (fine metering);

FIG. 13 shows a schematic perspective view of the outlet nozzle corresponding to FIGS. 9 and 11, with a clamp mounted on the outside of the substantially slot-shaped outlet opening thereof, wherein the clamp has been elastically deformed as a result of higher compressive forces acting approximately in the direction of extent of its legs in order to move the outlet opening into an open position with a large opening cross section (coarse metering);

FIG. 14 shows a schematic plan view from below of the outlet nozzle provided with the clamp, in the situation according to FIG. 13 (coarse metering);

FIG. 15 shows a schematic perspective view of one embodiment of an actuating device of a metering unit according to the invention in an operating situation before or after metering flowable solid from the outlet nozzle provided with the clamp; and FIG. 16 shows a schematic perspective view of the actuating device corresponding to FIG. 15 in an operating situation during the metering of flowable solid from the outlet nozzle provided with the clamp.

Figure 1:
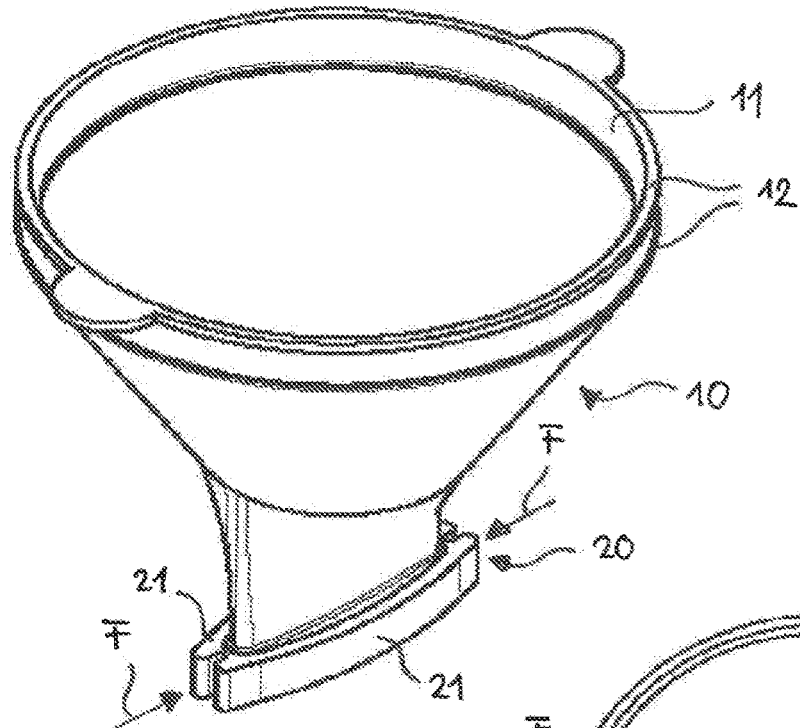
FIG. 1 shows a schematic perspective view of one embodiment of an outlet nozzle of a metering unit according to the invention having a clamp mounted on the outside of the substantially slot-shaped outlet opening thereof.
Figure 2:
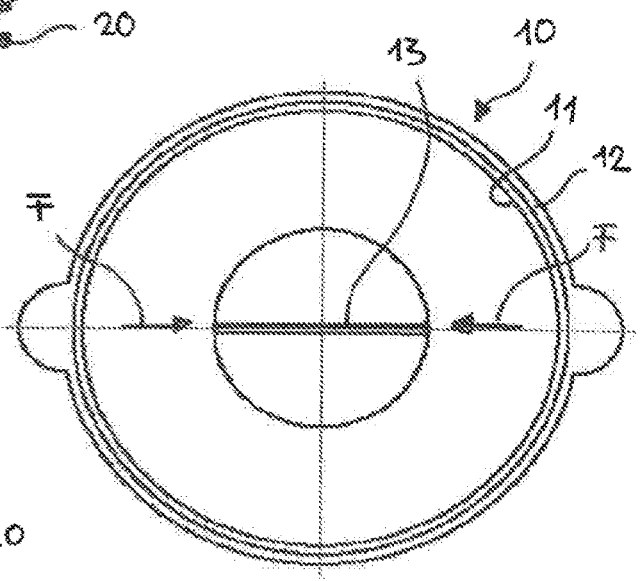
FIG. 2 shows a schematic plan view of the outlet nozzle according to FIG. 1 from above.
Figure 3:
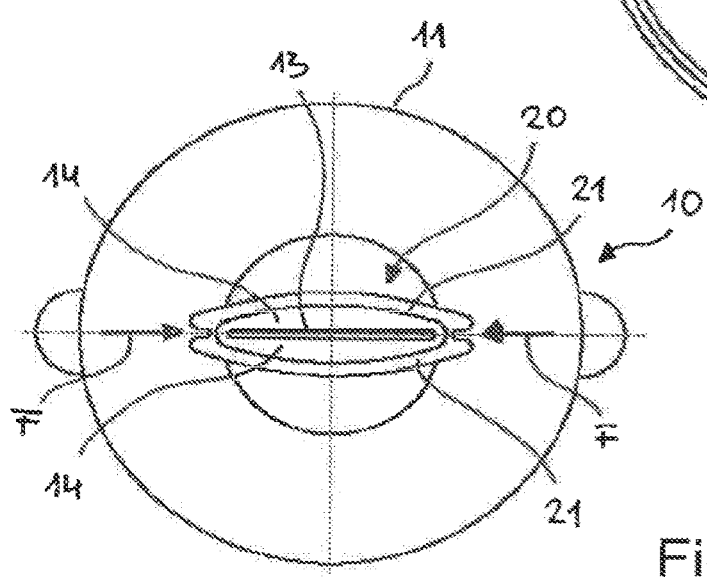
FIG. 3 shows a schematic plan view from below of the outlet nozzle provided with the clamp according to FIGS. 1 and 2.

While FIGS. 1 to 3 show one embodiment of an outlet nozzle, designated overall by the reference sign 10, of a metering unit according to the invention for powdered or particulate flowable solids, on which a clamp 20 has already been mounted, FIG. 4 shows the same outlet nozzle 10 without a clamp, and FIGS. 5 to 8 show only the clamp 20, on the one hand in the undeformed, unmounted state (FIGS. 5 and 6) and, on the other hand, in an elastically deformed state (FIGS. 7 and 8), as corresponds to the state of the clamp 20 according to FIGS. 1 to 3 mounted on the outlet nozzle 10. The outlet nozzle 10 is produced from a first flexibly elastically deformable polymer material, e.g. from a, preferably thermoplastic, polyurethane elastomer, wherein in the exemplary embodiment illustrated in the drawing it is moulded integrally therefrom and is configured, for example, as an injection moulding or casting. The clamp 20 is manufactured from a second, likewise flexibly elastic polymer material, e.g. likewise from a preferably thermoplastic polyurethane elastomer, and in the present exemplary embodiment is likewise moulded integrally therefrom. The first flexibly elastic polymer material of the outlet nozzle 10 may be the same material as the second flexibly elastic polymer material of the clamp 20, or the latter has a greater modulus of elasticity than that of the outlet nozzle 10, with the result that the flexibly elastic material of the clamp 20 requires greater deformation forces than that of the outlet nozzle 10 for its elastic deformation or is somewhat "more rigid" in comparison therewith (cf. also further below).

As can be seen in particular from FIGS. 1 to 4, the outlet nozzle 10 has an inlet opening 11 at its one end, the upper end in FIGS. 1 and 4, which has, for example, a round cross section—here an approximately circular cross section—and serves for fixing on the outlet of a storage container, not shown in the drawing, which can be configured in accordance with the prior art and serves for the storage of a flowable solid. In order to be able to fix the outlet nozzle 10, in particular releasably, on the outlet of such a storage container, the inlet opening 11 is equipped on its outer circumference with fastening structures 12, which, in the present exemplary embodiment, comprise two parallel circumferential projections and, for example, can receive a pipe clamp (not shown) substantially positively between them in order to be able to fasten the outlet nozzle 10 to its inlet opening 11 both positively and non-positively, but nevertheless releasably, to the outlet of the storage container.

From its inlet opening 11, the outlet nozzle 10 tapers substantially in a funnel shape downwards in the direction of an outlet opening 13, which is arranged at the opposite end of the inlet opening 11 and is substantially slot-shaped (cf. in particular FIGS. 2 and 3) and is formed between two opposite sealing lips 14 (cf. FIG. 3) of the outlet nozzle 10. The sealing lips 14 bounding the substantially slot-shaped outlet opening 13 between them have an outer circumference which is convex in relation to the outlet opening 13, e.g. approximately circular arc-shaped, and, if appropriate, are capable of elastically preloading the outlet opening 13 at least slightly into its closed position according to FIGS. 2 and 3, in which the sealing lips 14 come to bear against one another substantially completely, as a result of their elastic flexibility. If a compressive force acting approximately in the direction of extent of the slot-shaped outlet opening 13 is exerted on the substantially slot-shaped outlet opening 13 or on the sealing lips 14 forming the latter between them, as indicated by the reference sign F in FIGS. 1 to 4, the outlet opening 13 can be transferred to an open position in that the sealing lips 14 are spread apart or moved away from one another, the opening cross section of the substantially slot-shaped outlet opening 13 becoming larger with increasing force action (in this respect see also FIGS. 9 to 14 explained further below).

As can furthermore be seen, in particular, from FIGS. 1 to 4, for the purpose of an optimum closing capacity, even after prolonged operation, without the risk of contamination of the flowable solids to be metered, the substantially slot-shaped outlet opening 13 of the outlet nozzle 10 is elastically preloaded into its closed position by means of the clamp 20 designed as a separate component, wherein the clamp 20 is mounted releasably on the convex outer circumference of the sealing lips 14 forming the outlet opening 13 between them. In this case, the elastic preloading of the substantially slot-shaped outlet opening 13 of the outlet nozzle 10 formed between the sealing lips 14 in the direction of the closed position by means of the clamp 20 mounted on the outside of the outlet nozzle takes place in such a way that the legs 21 of the flexibly elastic clamp 20, which rest on the outside of the sealing lips 14 in the mounted state according to FIGS. 1 to 3, are elastically preloaded in the direction of the position in which they are close together, with the result that they press the sealing lips 14 against one another between them along the entire length of the substantially slot-shaped outlet opening 13. If, on the other hand, the legs 21 of the clamp 20 are acted upon by compressive forces which act on the clamp 20 approximately in their direction of extent, i.e. also approximately in the direction of extent of the sealing lips 14 and of the slot-shaped outlet opening 13 formed between them, as indicated by the reference sign F in FIGS. 1 to 4, then the two legs 21 of the clamp 20 are moved away from one another or spread apart, wherein at the same time the sealing lips 14 of the outlet nozzle 10 are spread apart in the manner described above, and the slot-shaped outlet opening 13 is consequently transferred to an open position, the opening cross section of which can be set by the amount of the compressive forces F acting (cf. also FIGS. 9 to 14).

In order to provide for the elastic preloading of the sealing lips 14 towards one another, that is to say in the direction of the closed position of the substantially slot-shaped outlet opening 13 formed between the sealing lips 14, the legs 21 of the clamp 20 in the unloaded, unmounted state have an inner circumference which is curved convexly at least to a lesser extent than the convexly curved outer circumference of the sealing lips 14, in the present case even having a slightly concavely curved inner circumference. This becomes clear, in particular, from FIGS. 5 and 6, which show the clamp 20 in the unloaded state. Consequently, if the clamp 20 is mounted on the convexly curved outer circumference of the sealing lips 14 of the outlet nozzle 10, which form the outlet opening 13 between them (cf. FIGS. 1 to 3), the legs 21 of the clamp 20 must be spread apart in the process along the convex outer circumference of the sealing lips, resulting in the flexibly elastic preloading of the sealing lips 14 towards one another, i.e. in the direction of the closed position of the outlet opening 13. For illustrative reasons, the spread apart position of the legs 21 of the clamp 20 for the purpose of elastic preloading is shown again in the detail views according to FIGS. 7 and 8. In this case, the clamp 20 is advantageously of substantially annular configuration, with the result that in the mounted state (cf. FIGS. 1 to 3) it completely surrounds the sealing lips 14 forming the outlet opening 13 between them.

Particularly in FIG. 4 and FIG. 8, it can furthermore be seen that the clamp 20 can be mounted not only non-positively but also positively on the outer circumference of the sealing lips 14 of the outlet nozzle 10, it being equipped for this purpose with inner engagement structures 22 which are complementary to outer engagement structures 15 of the sealing lips 14. While, in the present case, the outer engagement structures 15 of the sealing lips 14 are configured in the form of a pair of circumferential projections, the complementary inner engagement structures 22 of the clamp 20 are formed in the form of a pair of circumferential grooves, although, of course, any other known engagement structures are also conceivable.

While the closed position of the substantially slot-shaped outlet opening 13 of the outlet nozzle 10 is shown schematically once again in FIGS. 9 and 10, FIGS. 11 to 14 show, by way of example, different open positions of the substantially slot-shaped outlet opening 13 as a function of compressive forces F acting towards one another, counter to the flexibly elastic preloading of the legs 21 of the clamp 20. While no compressive forces F are exerted in FIGS. 9 and 10 (F=0), and therefore the slot-shaped outlet opening 13 is in its closed position, only relatively low compressive forces F are exerted in FIGS. 11 and 12, with the result that the slot-shaped outlet opening 13 opens only slightly, as is expedient, for example, for fine metering. In contrast, higher compressive forces F are exerted in FIGS. 13 and 14, with the result that the slot-shaped outlet opening 13 opens (significantly) further, as is appropriate, for example, for coarse metering.

Finally, FIGS. 15 and 16 show an embodiment of an actuating device 30 of the metering unit which serves to apply the compressive forces F (cf. FIGS. 1 to 4, 10, 12 and 14) to the clamp 20, which has been mounted on the outer circumference of the sealing lips 14 of the outlet nozzle 10 which bound the outlet opening 13 of the outlet nozzle 10, approximately in the direction of extent of the legs 21 of the clamp 20, which rest on the outside of the sealing lips 14, in order to move the legs 21 of the clamp 20 elastically away from one another and, in the process, to transfer the substantially slot-shaped outlet opening 13 of the outlet nozzle 10 from its closed position to an open position. For this purpose, the actuating device 30 has two actuating fingers 31, which can be moved towards one another and away from one another in the direction of the arrow P and, in the present case, are provided, for example on their mutually facing sides, in each case with an engagement profile 32, said profiles being of substantially complementary design to the outer contour of the mutually opposite ends of the clamp 20. For the reciprocating movement of the actuating fingers 31 towards and away from one another, the latter are fixed, for example, to a respective carriage 33, which is guided so as to be movable along a respective guide 34—in this case in the form of a linear guide—resulting in a translational movement of the actuating fingers 31 (cf. the arrow P in FIGS. 15 and 16). While the actuating fingers 31 of the actuating device 30 are in a metering position in FIG. 16 (their spacing from one another is less than the length of the clamp 20, with the result that the latter is elastically compressed and, as a result, the substantially slot-shaped outlet opening 13 of the outlet nozzle 10 has been transferred to an open position), the actuating fingers 31 are in a rest position before or after a metering operation in FIG. 15 (their spacing is greater than the length of the clamp 20, and therefore no compressive forces are exerted thereon).

In the exemplary embodiment shown, the actuating fingers 31 can be moved in a controlled manner by means of in each case one or a common motor drive, e.g. in the form of an electric motor, which drives a respective carriage 33, to which a respective actuating finger 31 is fastened, and cannot be seen in FIGS. 15 and 16 because of its accommodation in the interior of a housing 35 of the actuating device 30. The actuating device 30 can furthermore preferably comprise an electronic control unit (likewise not visible), which is operatively connected to the motor drive of the actuating fingers 31 in order to drive the latter in accordance with the desired opening cross section of the outlet opening 13 of the outlet nozzle 10 (cf. in this respect FIGS. 9 to 14), i.e. to transfer the actuating fingers 31 to the respectively desired distance from one another, as corresponds to the respectively desired opening width of the substantially slot-shaped outlet opening 13 of the outlet nozzle 10. The control unit is furthermore expediently operatively connected to a weighing device known as such (likewise not shown in the drawing) in order to actuate the actuating fingers 31 in accordance with the desired metered quantity, wherein the actuating fingers 31 are, in particular, moved apart again, away from the clamp 20, as soon as the desired metered quantity has been detected gravimetrically. As already mentioned above, the weighing device can be assigned either to the storage container (not shown), on the outlet of which the outlet nozzle 10 is fixed and from which the flowable solid is removed, or to a collecting container (not shown), into which the flowable solid is fed.

Finally, provision can also advantageously be made for the actuating fingers 31 to be set into an oscillatory movement, in particular with a pre-settable amplitude, by means of their motor drive during a metering operation of the kind that can be seen in FIG. 16 in order to ensure improved discharge of the metered flowable solids during the metering operation when the outlet opening 13 of the outlet nozzle 10 is set to an open position, in that the oscillatory movement ensures agitation of the powdered and/or particulate solids, ensuring that these continue to flow and do not come to a halt. The oscillatory movement of the actuating fingers 31 in the form of a reciprocating movement with a small amplitude can preferably take place in the same direction as the movement of the actuating fingers 31 towards one another and away from one another (arrow P), enabling it to be performed by means of the same motor of the drive which drives the carriages 33 along the guides 34 and does not require an additional motor.

The invention claimed is:

1. A metering unit for flowable solids comprising an outlet nozzle which is moulded from a first flexibly elastic material and has at a first end thereof an inlet opening, the inlet opening being designed for fixing on an outlet of a storage container, the outlet nozzle having at a second end thereof a slot-shaped outlet opening, the slot-shaped outlet opening being formed between two opposite sealing lips of the outlet nozzle and elastically preloaded in a direction of a closed position thereof and can be transferred against elastic preloading thereof to an open position as a result of compressive forces which act approximately in a direction of extent thereof, wherein the slot-shaped outlet opening of the outlet nozzle is elastically preloaded into the closed position by a separate clamp made from a second flexibly elastic material, the clamp being mounted releasably on an outer circumference of the sealing lips bounding the slot-shaped outlet opening, wherein legs of the clamp, which rest on an outside of the sealing lips in a mounted state, are elastically preloaded in a direction of a position in which the legs are close together and can be moved elastically away from one another as a result of the compressive forces which act approximately in the direction of extent.

2. The metering unit according to claim 1, wherein the slot-shaped outlet opening formed between the sealing lips is elastically preloaded in a direction of the closed position solely on account of elastic reverse deformation behaviour of the first flexibly elastic material of the outlet nozzle.

3. The metering unit according to claim 1, wherein:
   the sealing lips forming the slot-shaped outlet opening of the outlet nozzle have therebetween the outer circumference which is convexly curved at least in some section or sections of the sealing lips; and
   the legs of the clamp have an inner circumference in an unmounted state thereof which is convexly curved to a lesser extent than a convex curvature of the sealing lips, is rectilinear or concavely curved.

4. The metering unit according to claim 1, wherein the clamp is of annular design and, in the mounted state, completely surrounds the sealing lips forming the slot-shaped outlet opening of the outlet nozzle between the sealing lips.

5. The metering unit according to claim 1, wherein the clamp:
   can be mounted non-positively on the outer circumference of the sealing lips bounding the slot-shaped outlet opening of the outlet nozzle; and/or
   can be mounted positively on the outer circumference of the sealing lips bounding the slot-shaped outlet opening of the outlet nozzle.

6. The metering unit according to claim 5, wherein the clamp is equipped with inner engagement structures which are complementary to outer engagement structures of the sealing lips.

7. The metering unit according to claim 1, wherein the outlet nozzle tapers approximately in the shape of a funnel from the inlet opening in a direction of the slot-shaped outlet opening.

8. The metering unit according to claim 1, wherein the inlet opening of the outlet nozzle can be releasably fastened to the storage container.

9. The metering unit according to claim 8, wherein the inlet opening is provided with fastening structures which are used for non-positive and/or positive attachment of a pipe clamp.

10. The metering unit according to claim 1, wherein the first flexibly elastic material of the outlet nozzle is a first elastomeric polymer material, wherein the outlet nozzle is formed from the first elastomeric polymer material.

11. The metering unit according to claim 10, wherein the outlet nozzle is moulded as an injection-moulding or casting from the first elastomeric polymer material.

12. The metering unit according claim 1, wherein the second flexibly elastic material of the clamp is a second elastomeric polymer material.

13. The metering unit according to claim 12, wherein:
the clamp is formed integrally from the second elastomeric polymer material; and/or
the second flexibly elastic material of the clamp has a greater modulus of elasticity than the first flexibly elastic material of the outlet nozzle.

14. The metering unit according to claim 1, further including an actuating device which is designed to apply the compressive forces to the clamp mounted on the outer circumference of the sealing lips bounding the slot-shaped outlet opening of the outlet nozzle, approximately in the direction of extent of the legs thereof which rest on the outside of the sealing lips, in order to move the legs of the clamp elastically away from one another and in the process to transfer the slot-shaped outlet opening of the outlet nozzle from the closed position to the open position.

15. The metering unit according to claim 14, wherein the actuating device has two actuating fingers which can be moved towards one another and away from one another and which serve to apply the compressive forces to the clamp mounted on the outer circumference of the sealing lips bounding the slot-shaped outlet opening of the outlet nozzle.

16. The metering unit according to claim 15, wherein the two actuating fingers of the actuating device are each provided on mutually facing sides thereof with an engagement profile, the engagement profile being configured in a manner complementary to an outer contour of mutually opposite ends of the clamp.

17. The metering unit according to claim 15, wherein the two actuating fingers can be moved in a controlled manner by a motor drive.

18. The metering unit according to claim 17, wherein the actuating device comprises an electronic control unit operatively connected to the motor drive of the two actuating fingers.

19. The metering unit according to claim 18, wherein the electronic control unit is furthermore operatively connected to a weighing device in order to actuate the two actuating fingers in accordance with a desired metered quantity.

20. The metering unit according to claim 17, wherein the two actuating fingers can be transferred to different distances from one another by the motor drive in order to set different opening widths of the slot-shaped outlet opening of the outlet nozzle.

21. The metering unit according to claim 17, wherein an oscillatory movement can be imparted to the two actuating fingers by the motor drive in order to ensure improved discharge of metered, flowable solids during a metering operation when the slot-shaped outlet opening of the outlet nozzle is set to the open position.

* * * * *